US007009717B2

(12) United States Patent
Van Coppenolle et al.

(10) Patent No.: US 7,009,717 B2
(45) Date of Patent: Mar. 7, 2006

(54) OPTICAL PROBE FOR SCANNING THE FEATURES OF AN OBJECT AND METHODS THEREFOR

(75) Inventors: Bart Van Coppenolle, Linden (BE); Lieven De Jonge, Overijse (BE); Kris Vallons, Aarschot (BE); Frank Thys, Willebroek (BE)

(73) Assignee: Metris N.V., Leuven (BE)

( * ) Notice: Subject to any disclaimer, the term of this patent is extended or adjusted under 35 U.S.C. 154(b) by 0 days.

(21) Appl. No.: 10/640,882

(22) Filed: Aug. 13, 2003

(65) Prior Publication Data
US 2004/0130729 A1    Jul. 8, 2004

Related U.S. Application Data

(60) Provisional application No. 60/420,909, filed on Oct. 23, 2002.

(30) Foreign Application Priority Data

Aug. 14, 2002   (EP)   .................................. 02447154

(51) Int. Cl.
   *G01B 11/24*   (2006.01)
   *G01B 11/30*   (2006.01)
   *G01B 11/14*   (2006.01)
   *G01N 21/86*   (2006.01)
(52) U.S. Cl. ...................... 356/603; 356/601; 356/625; 250/559.19
(58) Field of Classification Search ........ 356/3.1–3.13, 356/601–604, 606–608, 614, 615, 622, 623, 356/3.01, 3.03; 382/154; 250/559.19, 559.22, 250/559.24, 559.27, 559.29, 559.31, 559.33
See application file for complete search history.

(56) References Cited

U.S. PATENT DOCUMENTS

| 3,985,422 | A | * | 10/1976 | Mecklenborg et al. ...... 359/433 |
| 4,515,479 | A |   | 5/1985 | Pryor |
| 5,774,220 | A |   | 6/1998 | Wienecke |
| 5,987,349 | A | * | 11/1999 | Schulz ....................... 600/427 |
| 6,205,240 | B1 | * | 3/2001 | Pietrzak et al. ............. 382/152 |
| 6,542,249 | B1 | * | 4/2003 | Kofman et al. ............. 356/601 |
| 2001/0040683 | A1 |   | 11/2001 | Hofman |

FOREIGN PATENT DOCUMENTS

EP        0 305 107 A2    3/1989

(Continued)

OTHER PUBLICATIONS

European Patent Office Search Report, Application No. EP 03447209, Nov. 17, 2003.
Reinshaw, Probing systems for co-ordinate measuring machines:, H-1000-5050-16-A product technical specification, Aug. 2003.

(Continued)

*Primary Examiner*—Layla G. Lauchman
*Assistant Examiner*—Gordon J. Stock, Jr.
(74) *Attorney, Agent, or Firm*—Knobbe Martens Olson & Bear LLP (57) ABSTRACT

An optical probe for measuring features of an object comprises two or more viewing directions and two or more projection directions. A method of measuring the features of an object comprises configuring an optical probe into two or more optical groups, wherein an optical group comprises one or more viewing directions and one or more projection directions, wherein at least one viewing direction and at least one projection direction is different between the optical groups, and wherein data obtained by the viewing directions is generated only from patterns projected by the projection directions of the same optical group. The method further comprises collecting data from each optical group while scanning the object.

42 Claims, 5 Drawing Sheets

FOREIGN PATENT DOCUMENTS

| | | |
|---|---|---|
| JP | 2000180103 | 6/2000 |
| WO | WO 91/08439 A1 | 6/1991 |
| WO | WO 0039522 A1 | 7/2000 |
| WO | WO 0041141 A1 | 7/2000 |
| WO | WO 0107866 A1 | 2/2001 |
| WO | WO 01/86227 A1 | 11/2001 |

OTHER PUBLICATIONS

FARO, "FARO Increases Versatility with 3D Laser Scanner", FARO Laser Scan Arm Product Techsheet, Nov. 3, 2004.

* cited by examiner

OPTICAL PROBE FOR SCANNING THE FEATURES OF AN OBJECT AND METHODS THEREFOR

CROSS REFERENCE TO RELATED APPLICATION

This application claims priority to U.S. Provisional Patent Application 60/420,909 entitled "CROSS LASER SCANNER" and filed on Oct. 23, 2002. The disclosure of the above-described filed application is hereby incorporated by reference in its entirety.

BACKGROUND OF THE INVENTION

1. Field of the Invention

The present invention relates to the field of optical scanning technology. One aspect the present invention relates to an optical probe optionally for use on a localizer. In another aspect, the present invention relates to a method for scanning an object using the optical probe according to the invention, optionally connected to a localizer.

2. Description of the Related Art

In order to optically measure the position and the dimensions of features in industrial objects such as holes, slots, edges or gap and flush, different solutions presently exist. For example, there are dedicated measuring machines such as profile projectors. However, these machines lack flexibility and measuring speed. There are also machines, generally defined as localizers, capable of positioning and orienting an optical probe in three-dimensional space. The localizer records the position and orientation of the probe with a position-dependent accuracy. These localizers can be, for example, coordinate measuring machines, articulated arms, robots or machining centers. Various optical probes may be mounted on these localizers such as video probes, laser scanners or probes with fringe or pattern projection. All these probes use analogue or digital cameras; most have a charge-coupled device, or CCD-array that is one-dimensional, (i.e. line), or two-dimensional, (i.e. matrix) for receiving the light returning from the object being measured, the light having passed through a series of optics.

One example of a probe of the art is a video probe, which, by back and/or front lighting an object uses image processing to measure a feature of an object. Video probes are basically two-dimensional probes; the third dimension is derived from the auto focus optics, if available. They are quite inaccurate and are not suited for highly curved three-dimensional parts.

Almost all probes that project light and capture all or part of the returning light use triangulation to determine the shape of the object, and to generate a point cloud therefrom. In the triangulation scheme, one or more light sources project light of a certain pattern and in a certain direction onto the object. Viewing optics orientated in certain viewing directions capture the returning light and bring it through one or more optical paths to one or more receivers, such as an analogue or digital camera.

The light projected from an optical probe might originate from one or more 'projection directions'. For example, where the projected light originates from a discreet projection point, area or volume onto the object, the projected light is referred to as having a single projection direction. Where a probe has two projection directions, the projected light is emitted from two different projection points, areas or volumes in the probe, onto the object. A multiplicity of projection directions requires a corresponding number of projection points, areas or volumes in the probe.

The projected light might form a pattern on the object such as a point, a line, several parallel or intersecting lines, concentric circles, grid of points, etc. Many patterns of light are possible and of different complexity. The pattern might become distorted on the object due to the relief of the object and the angle of the probe relative to the object. The undistorted pattern projected from a projection direction is known as the 'pattern direction' and is defined as the pattern direction formed on a flat surface that is orthogonal to the projection direction. Thus, a probe projecting light from two projection direction will have two pattern directions. A multiplicity of pattern directions requires a corresponding number of projection directions in the probe.

A probe having a single point, area or volume therein from which to accept light returning from the object is referred to as having a single 'viewing direction'. The point, area or volume in practice might be a CCD camera, a single set of receiving lenses, a single set of mirrors. Where the probe accepts light returning from the object from two different directions, it is referred to as having two viewing directions. In practice, a probe having two viewing directions might have two CCD cameras placed slightly apart, or it might have an arrangement of mirrors and/or lenses which direct light from the object from two different points in the probe onto a single CCD camera.

Probes of the prior art which are mounted on a localizer have a single light source, one or two viewing directions, one projection direction and a line, fringes or black-white stripes in the pattern direction for moire analysis; these probes are inaccurate, and when they are used for measuring features in objects, they are slow and have to be reoriented several times by the localizer in order to measure the features properly. The best accuracy is reached when the lines in the pattern direction are orthogonal to the edges in the object. This rule implies that a hole or circle requires at least two orthogonal sets of stripes in the pattern. The scanning would require a set of translational movements of the probe to cover the complete circle—which would be slow, or a 900 rotational movement of the probe—which would require the user to modify localizers capable of translational movements only by inserting a device capable of movement about one or two rotary axes; such devices are inserted between the localizer head and the probe. These rotary axes may be indexed or continuous. In both cases, translational and/or rotational movements of the probe required to scan a hole or circle are mechanically complicated.

Laser scanners project laser light and have a single pattern direction and one or more viewing directions, usually two CCD-cameras to receive the returning light. With respect to the laser scanner itself, the pattern can be formed by a laser point that is stationary (point laser scanner), or has a linear (line laser scanner) or a circular (circle laser scanner) movement. Other line laser scanners generate a laser line on the object without any moving or rotating parts in the probe itself, mostly by using a cylindrical lens in the laser optics. Most of these scanners are used for digitizing full objects and are relatively accurate. The use of two or more viewing directions in some laser scanners, reduces the chances of line of sight between the receiving optics and the part of the object that is highlighted by the laser becoming blocked by a part of the object itself during scanning. All receiving and emitting optical paths are usually positioned on one line or in one plane.

If a line laser scanner is used for measuring features in objects, ideally the laser line should be orthogonal to the feature itself. This implies that translational movements of the line laser scanner made by the localizer in general are not by themselves sufficient to accurately measure the feature; rotational movements of the scanner would be necessary. For example, a feature with a curved edge will generate translational and rotational movements of the scanner to keep the laser line orthogonal to the edge during measurement. For localizers with translational axes only, this is done by inserting a device capable of one or two rotary movements, either indexed or continuous axes, just before the laser scanner. However, and as already mentioned above, the approach comprising translational and rotational movements of the laser scanner is mechanically complicated.

To avoid the mechanical complicated arrangement, some optical scanners comprise multiple projection directions and only one viewing direction. Alternatively, some have one projection direction that has a suitable pattern (like crossing lines) and multiple viewing directions. Furthermore, some optical scanners of the art project pattern directions simultaneously, and analyze the patterns so-projected as one image. Due the limited depth of view of the optical arrangement in the viewing direction it is difficult to obtain an accurate image of all the projected patterns simultaneously with only one viewing direction. If one projection direction with a complex pattern is used, it is difficult to achieve a good accuracy of feature measurement, even with multiple viewing directions over the complete pattern.

Therefore, there remains a need from the prior art for an easier and improved optical probe for scanning and measuring the features in an object, and methods therefor. The present invention provides an optical probe and methods, which overcome the difficulties and drawbacks of the presently known optical probes and methods.

SUMMARY OF CERTAIN INVENTIVE EMBODIMENTS

One embodiment of the present invention is a method for measuring the features of an object using an optical probe comprising more than one projection directions and more than one viewing directions comprising a) configuring the optical probe into two or more optical groups, wherein an optical group comprises one or more viewing directions and one or more projection directions, and wherein at least one viewing direction and at least one projection direction is different between the optical groups, wherein data obtained by the viewing directions is generated only from patterns projected by the projection directions of the same optical group; b) collecting data from each optical group while scanning the object; and c) obtaining a measurement of the features of the object from the collected data.

Another embodiment of the present invention is a method as described above wherein each the optical group of the optical probe has part of its one dimensional, two dimensional or three-dimensional working volume common with the one dimensional, two dimensional or three dimensional working volume of another optical group.

Another embodiment of the present invention is a method as described above wherein each optical group consists of one line pattern direction projected through one projection direction and one or more viewing directions.

Another embodiment of the present invention is a method as described above, wherein the number of optical groups is two and the line patterns directions cross each other orthogonally with a maximum deviation of about 20 degrees.

Another embodiment of the present invention is a method as described above wherein the number of optical groups is three and the line patterns cross each other two by two with an angle of about 120±20 degrees.

Another embodiment of the present invention is a method as described above wherein the number of optical groups is four and every line pattern is parallel to one other the line pattern with a maximum deviation of about 20 degrees, and orthogonal to the two other line patterns with a maximum deviation of about 20 degrees.

Another embodiment of the present invention is a method as described above, wherein each line pattern has two the viewing directions and the viewing directions are positioned opposite to each other with respect to the line pattern.

Another embodiment of the present invention is a method as described above wherein light is projected from one optical group at a time.

Another embodiment of the present invention is a method as described above wherein projected light from one optical group has a strobing frequency that different from light projected from one or more other optical groups.

Another embodiment of the present invention is an optical probe suitable for measuring the features of an object comprising one or more light sources generating, through one or more optics, two or more patterns each projected in a different projection direction, two or more optics for accepting the light returning from patterns projected on the object, each optic having a different viewing direction, and one or more detectors for receiving light returning through the optics.

Another embodiment of the present invention is an optical probe as described above, wherein each projection direction projects a pattern projection that is a line pattern.

Another embodiment of the present invention is an optical probe as described above, wherein the number of projection directions is two and each line pattern crosses the other orthogonally with a maximum deviation of about 20 degrees.

Another embodiment of the present invention is an optical probe as described above, wherein the number of projection directions is three and the line patterns cross each other, and the angle between any two lines is about 120±20 degrees.

Another embodiment of the present invention is an optical probe as described above, wherein the number of projection directions is four and every line pattern is parallel to one other the line pattern with a maximum deviation of about 20 degrees, and orthogonal to the two other line patterns with a maximum deviation of about 20 degrees.

Another embodiment of the present invention is an optical probe as described above, wherein each line pattern has two viewing directions and the viewing directions are positioned opposite to each other with respect to the line pattern.

Another embodiment of the present invention is an optical probe as described above wherein the detectors receiving the returning light are CCD cameras positioned in the probe according to the Schweimpflug principle.

Another embodiment of the present invention is an optical probe as described above, comprising one CCD camera.

Another embodiment of the present invention is an optical probe as described above comprising a mounting suitable for connection to a localizer.

Another embodiment of the present invention is an optical probe as described above wherein the mounting enables position-repeatable coupling and decoupling of the probe to the localizer.

Another embodiment of the present invention is an optical probe as described above, further comprising a localizer for positioning and orientating the optical probe in a one-, two-or three-dimensional working volume.

Another embodiment of the present invention is an optical probe as described above wherein the localizer is capable of one more rotational and/or one or more translational axes of movement.

Another embodiment of the present invention is an optical probe comprising three lasers projecting through optics, three single line patterns, three optics for accepting the returning light returning from the projection of the line patterns on an object, and three analog or digital cameras receiving the returning light through the optical paths, wherein the angle between intersecting lines is about 120±20 degrees, wherein the three projection directions have mutual angles such that the working volumes corresponding to the viewing direction have a common part, and wherein the optical probe is connected to a localizer consisting of one or more rotational and/or one or more translational axes for positioning and orientating the optical probe in a one-, two- or three-dimensional working volume.

Another embodiment of the present invention is a method for measuring the features of an object comprising the use of an optical probe as described above.

Another embodiment of the present invention is a method for measuring the features of an object using an optical probe comprising three projection directions and three viewing directions comprising a) configuring the optical probe into three optical groups, wherein each optical group comprises one viewing direction and one projection direction, and wherein each viewing direction and each projection direction is different between the optical groups, wherein data obtained by the viewing directions is generated only from patterns projected by the projection directions of the same optical group, wherein every two optical groups have an angle of 120°+/−20° between their the single line patterns, wherein the three projection directions created by three projection directions have mutual angles such that the working volumes of each optical group of one the single line pattern and corresponding viewing direction have a common part, wherein the optical probe is connected to a localizer consisting of one or more rotational and/or one or more translational axes for positioning and orientating the optical probe in a one-, two- or three-dimensional working volume; b) collecting data from each optical group while scanning the object; and c) obtaining a measurement of the features of an object from the collected data.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

The inventors have found that an optical probe comprising two or more projection directions and two or more viewing direction provides an unexpected increase in the accuracy and speed of measuring the features of an object.

By measuring the features of an object is meant herein obtaining data enabling the dimensions to be determined of the features of an object. The features may be any change in the relief of the surface of an object such as hole(s), slot(s), edge(s), gap(s), groove(s), flush(s), step(s), protrusion(s), bump(s), etc. The data may be in the form of known in the art such as, but not limited to, a point cloud, a list of measurements, a look-up table, a data set suitable for interpretation by a computer, a set of data for use internally by a scanner. The features may be one or more features. The object may be one or more objects. The measurement of the features of an object may be of the complete object, a part of the object containing a feature, or several parts of the object, each part containing one or more features.

One embodiment of the present invention is an optical probe comprising one or more light sources generating, through one or more optics, two or more patterns each projected in a different projection direction, two or more optics for accepting the light returning from patterns projected on the object, each optic having a different viewing direction, and one or more detectors for receiving light returning through the optics.

Optics as used herein refers to a means for directing light from a source to a target. The source might be, for example, a laser and the target might be the object to be scanned. Alternatively, the source might be the illuminated object to be scanned, and the target might be a CCD camera. The means for directing light can be any known in the art and includes, but is not limited to one or more of holes, tubes, lenses, mirrors, prisms, fiber optics etc.

Detectors according to the invention are any that are capable of detecting the intensity of projected light in one dimension (e.g. a straight line) or two dimensions (e.g. a matrix). The light can be of any wavelength including that of the visible spectrum, infrared and ultraviolet. The detector might be, for example, a CCD camera.

The inventors have further found that by introducing the notion of 'optical groups' into a method for measuring the features of an object, the accuracy and speed improvements are greater still.

According to the invention, an optical group is a set of projection directions and viewing directions wherein the viewing directions generate data only for the projection directions of the same optical group. For example, an optical group may comprise one projection direction (e.g. one laser projecting a pattern) and one viewing direction (e.g. one CCD camera). An optical probe according to the invention may comprise two different optical groups e.g. two pairs of laser/CCDs wherein the position of the laser and CCD is different in each pair, and the data obtained from one CCD contains only information about the pattern projected by laser in the same optical group, and no information regarding the pattern projected by the laser belonging to the other optical group.

According to the invention, an optical group is not limited to one projection direction and one viewing direction, but may comprise more than one projection direction and more than one viewing direction. According to the invention, an optical probe is not limited to two optical groups, but may comprise more than two optical groups. Optical probes of the art typically have one optical group, which might consist of a laser line scanner projecting a laser line (1 projection direction) which is viewed from two cameras (2 viewing direction) positioned on opposite sides of the laser line. As already pointed out above, the arrangement of lasers and camera of the art is limited and requires complicated movements of the localizer and/or requires an additional device to enable complex rotational movements of the probe.

When using the optical probe according to the invention with more than one projection direction and more than one viewing direction, more complex measuring tasks such as the measurement of holes and slots can be undertaken more easily than before. By combining different viewing directions and projection directions a complex feature can be measured with a higher efficiency and a higher accuracy than before.

One embodiment of the present invention is a method for measuring the features of an object using an optical probe comprising more than one projection directions and more than one viewing directions comprising configuring the optical probe into two or more optical groups, collecting data from each optical group during the scanning procedure, and obtaining a measurement of the features of the object from the data.

According to the invention any optical probe comprising more than one projection directions and more than one viewing directions may be configured into two or more optical groups. Methods to so configure an optical probe according to the invention are known in the art.

According to the invention the scanning procedure refers to the movement of the optical probe across the surfaces of the object by a localizer in order to obtain a measurement of the features of an object. Alternatively, the scanning procedure refers to the movement of the surface of the object across the optical probe by a localizer in order to obtain a measurement of the features of an object. Such scanning procedures are well known in the art, and methods are known to move the probe or object relative to each other.

According to one aspect of the invention the collection of data from each optical group occurs with the probe and object held in the same orientation with respect of one another. Once data has been generated for each optical group for a particular relative orientation of probe and object, the localizer may move either object or optical probe to obtain the next set of readings.

According to an aspect of the invention, the movement of the localizer can be a translation or a rotation, or a combination of both. Part of the translation axes and part of the rotation axes have continuous movement; the rest may have indexed movement. In indexed mode, the movements of the localizer are discrete. In continuous mode, the movements are not discrete.

According to one aspect of the invention, all the projection directions of the respective optical groups are different. According to one aspect of the invention, at least one projection direction of an optical group is different from the projection directions of at least one other optical group.

According to one aspect of the invention, all the viewing directions of the respective optical groups are different. According to the invention, at least one viewing direction is different from the viewing directions of at least one other optical group By having at least one different projection direction and viewing direction different between the optical groups, each optical group can be optimized for a certain part of the measurement task. This novel and inventive approach to optical measurement makes it possible to create optical scanners that contain different optical groups each optimized for speed and accuracy.

It is an aspect of the invention that the method and device may be used to measure a whole object. It is an aspect of the invention that the method and device may be used to measure a part of an object. It is an aspect of the invention that the method and device may be used just to measure the features of an object. It is an aspect of the invention that the method and device may be used to measure the features of an object, and other methods and the same device are used to measure the parts of the object devoid of features.

It is an aspect of the invention that data obtained from one optical group is not 'contaminated' with data arising from a pattern projected from another optical group. Ways to achieve a data set that is pure for an optical group may be any that is known in the art or any future method.

For example, one optical group might project a pattern for a short period, during which time, light returning from the object is measured along the view directions of the same group; the projections of other optical groups are turned off during measurement. Then a second optical group may project a pattern from a different projection direction for a short period, during which time, light returning from the object is measured along the view directions of the second optical group; the projections of other optical groups are turned off during measurement. The projections and measurements are sequentially performed for each optical groups in sequence until data has been obtained for each optical group.

Another method of restricting the capture of data to each optical group is, for example to use wavelengths of light that are different for each projection direction. This would allow the simultaneous projection in all projection directions, and each projection direction (and hence optical groups) may be discerned by the detectors on the basis of wavelength.

Another method of restricting the capture of data to each optical group is, for example, to use light of different strobing frequency for each projection direction. This would again allow the simultaneous projection all projection directions, and each projection direction (and hence optical groups) may be discerned by the detectors on the basis of the frequency of strobing.

In another embodiment of the present invention, the working volumes of the optical groups overlap for a certain part of their working volumes. For example, the area of the surface scanned by the pattern and/or the area of the surface detected by the camera overlap for two or more optical groups. In this overlap area, the ideal measurement conditions can be created for each object to be measured.

In one embodiment of the invention, each optical group projects a line pattern in one projection direction which is viewed in one viewing direction. In another aspect of the invention, each optical group projects a line pattern in one projection direction which is viewed in more than one viewing direction. In another aspect of the invention, each optical group projects two or more line patterns, each in a different projection direction which are viewed in more one viewing direction. In another aspect of the invention, each optical group projects two or more line patterns, each in a different projection direction which are viewed in more than one viewing direction.

In one embodiment of the invention, two optical groups each project a line pattern from a single projection direction, and the line pattern from each projection direction crosses the other orthogonally, with a maximum deviation of 20 degrees.

In another embodiment of the invention, three optical groups, each project a line pattern from a single projection direction, and the line pattern from each projection direction crosses one or more other lines at an angle 120 degrees with a maximum deviation of 20 degrees.

In another embodiment of the present invention, the receiving optics for each laser line consists of two different optical paths. The optics are positioned as such in the probe that they are opposite to each other with respect to the laser line in question. In this way the chance that a part of the object blocks the line of sight between the projected laser line on the object and the receiving optics is reduced by 50%.

As mentioned above, use of the optical probe and methods according to the invention can simplify the movements of the localizer. Due to the design of the probe according to the invention, the number indexed rotations is minimized, and most of the time the rotations are limited to occurring between measurements and not during measurements. Furthermore, an indexable rotary head between the scanner and localizer, or as part of the localizer is mechanically less complicated than a continuous rotary head. For certain localizers, for example the co-ordinate measuring machines, this indexable rotary head is even an industry standard. Therefore, the invention provides a greatly simplified method and device for measuring the features of an object.

Another major improvement over the prior art according to the invention relates to a major reduction in measurement time. With an optical probe and methods according to the invention a feature can be measured in one sweep, while a conventional line scanner would have to cover the feature twice; scanning the feature a second time after rotating the optical probe.

Another advantage of the present invention is that the use of the line laser scanning principle is accurate, for both digitizing and for feature measurement.

In another embodiment, the present invention relates to an optical probe, wherein the cameras receiving the returning light are positioned in the probe according to the Schweimpflug principle. As known by one of skill in the art, the Schweimpflug principle provides guidance on how a camera lens should be tilted when focusing upon a plane that is not parallel to the film, as explained in the GB patent No 1196 and Harold M (1996), Scheimpflug's Patent, Merklinger, Photo Techniques. The Scheimpflug principle states that the object (film) plane, the subject plane (plane of sharp focus), and lens plane (the plane through the optical center and perpendicular to the lens axis) must converge along a single line.

In another preferred embodiment, the present invention relates to an optical probe, wherein one camera is used.

One embodiment of the present invention is an optical probe as described herein, further comprising a mounting for coupling with a localizer. The mounting may be any that allows the optical probe to be held and moved by the localizer. The mounting may be of a design that allows convenient connection to a reciprocal mounting on the localizer. The mounting may allow the transmission of translational and rotational movements from the localizer to the optical probe. It may also allow electrical contacts to be made with the localizer, for the purpose of, for example, the supply of power, the transmission of data, connection of fiber optics. The mounting may also allow fast and position-repeatable coupling and decoupling of the probe to the localizer. An example of a mounting according to the invention is a Renishaw Autojoint. The Renishaw Autojoint allows the coupling and decoupling of the probe to the localizer with one simple turn of a screw accessible from the outside in the mounting the coupling/decoupling. By having 3 pairs of small spheres at one side of the Autojoint and 3 corresponding spheres at the other side, the position of the probe may be repeatedly aligned with the localizer.

Another embodiment of the present invention is an optical probe as described herein, further comprising a localizer. The localizer may enable the translational and rotational movements from the localizer to the optical probe.

Another embodiment of the present invention is an optical probe as described herein not attached to a localizer.

In another embodiment of the present invention, the object is scanned by moving the object relative to a stationary optical probe.

In another embodiment the invention relates to a method for obtaining a measurement of the features of an object using an optical probe according to the invention, which is connected to a localizer, the method comprises positioning and orientating the optical probe by the localizer in a one-, two- or three-dimensional working volume; projecting onto an object, two or more laser lines having an angle of at least 10° between any two lines, the projection being performed by one or more laser diodes through optics; accepting the laser light returning from the projection of the laser lines on the object by two or more optics with one or more optical paths; and receiving the returning light through the optical paths by one or more analogue or digital cameras.

The invention provides an easy and time-effective scanning method by using the optical probe according to the invention.

According to one embodiment of the present invention the data obtained from each optical group may be transformed into a data form that indicates the measurement of the features of the object (e.g. a point cloud, a list of measurements, a look-up table, a data set suitable for interpretation by a computer, a set of data for use internally by a scanner) using calculation routines known in the art.

According to another embodiment of the present invention the probe and localizer may be calibrated-only, or simultaneously calibrated and qualified according to the method disclosed in European Patent application number 03447101.1, which is hereby incorporated by reference.

According to another embodiment of the present invention the data obtained from each optical group may be transformed into a data form that indicates the measurement of the features of the object (e.g. a point cloud, a list of measurements, a look-up table, a data set suitable for interpretation by a computer, a set of data for use internally by a scanner) using the procedures disclosed in European Patent application number According to another embodiment of the present invention the data obtained from each optical group may be transformed into a data form that indicates the measurement of the features of the object (e.g. a point cloud, a list of measurements, a look-up table, a data set suitable for interpretation by a computer, a set of data for use internally by a scanner) using the following method:
  a) scanning the object and obtaining readings from the receiver(s) in the optical probe,
  b) converting the readings to points or measurements in the working space of the receiver itself,
  c) using the calibration of the probe to convert the points or measurements to points or measurements in the coordinate frame of the optical probe itself, and
  d) if the optical probe is connected to a localizer, using the qualification to convert these points or measurements in the coordinate frame of the localizer.

In step a), the readings may be of any form known to the skilled artisan, for example bit-mapped intensities, or bit-mapped black/white indicators if a CCD camera is used.

In step b) the working space of the receiver may be one dimensional, two-dimensional or three-dimensional and may preferably be measured in pixel values.

In step c) the calibration of the probe may be obtained by any known in the art, or according to the method disclosed in European Patent application number 03447101.1. The coordinate frame of the optical probe itself may be measured in millimeters/inches SI units.

In step d) the qualification of the localizer/probe may be performed by any known in the art, or according to the method disclosed in European Patent application number 03447101.1.

Figure 1:
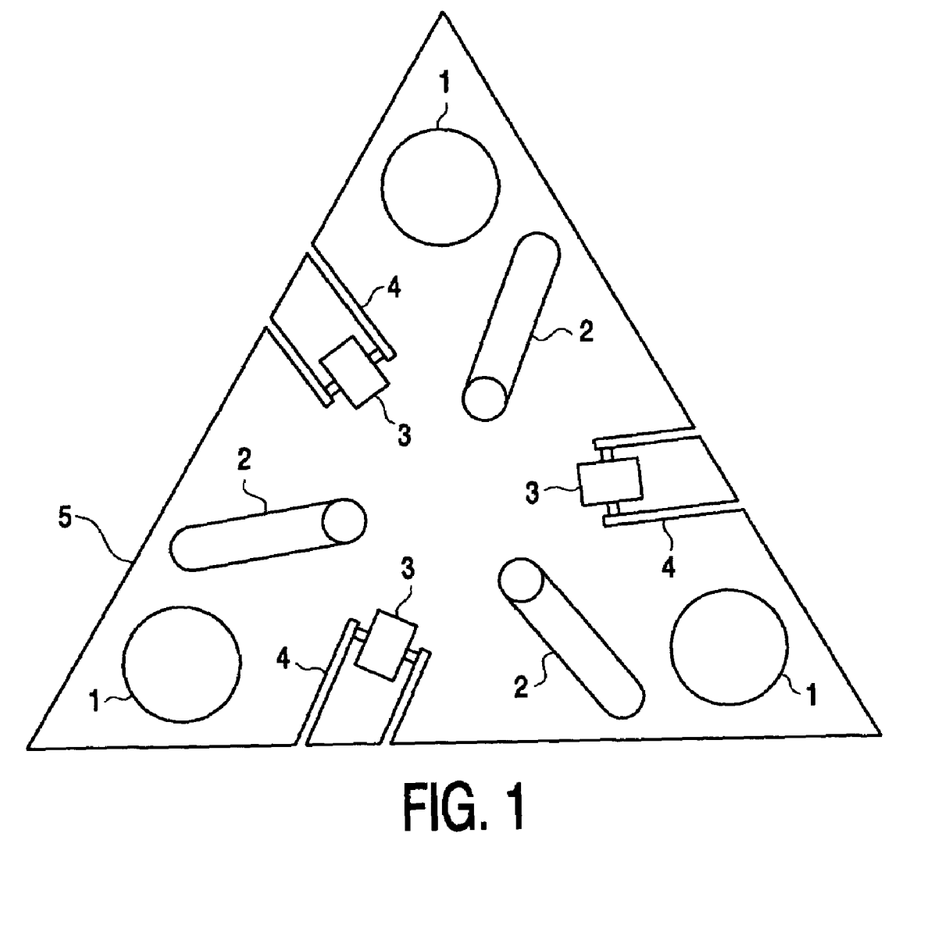
FIG. 1 is a schematic illustration of an example of an optical probe according to one aspect of the invention.

FIG. 1 is a schematic illustration of an example of an optical probe according to one aspect of the invention. The probe comprises a housing, the outline of which is shown 5. Three detectors with optics 1, are positioned at different locations in the probe, such that each has a different viewing direction. The detectors and/or optics may each be placed at a suitable tilt angle so that the light achieves maximum focus across the whole plane of the image. Three lasers 2 each project light onto a mirror assembly 3, 4. The mirror assembly comprises a mirror 3 and a mounting device 4 which oscillates the mirror such that the single point of light emitted by the laser is projected from the probe as a line. Each of the three mirrors reflect the laser light from probe in a different projection direction.

Figure 2:
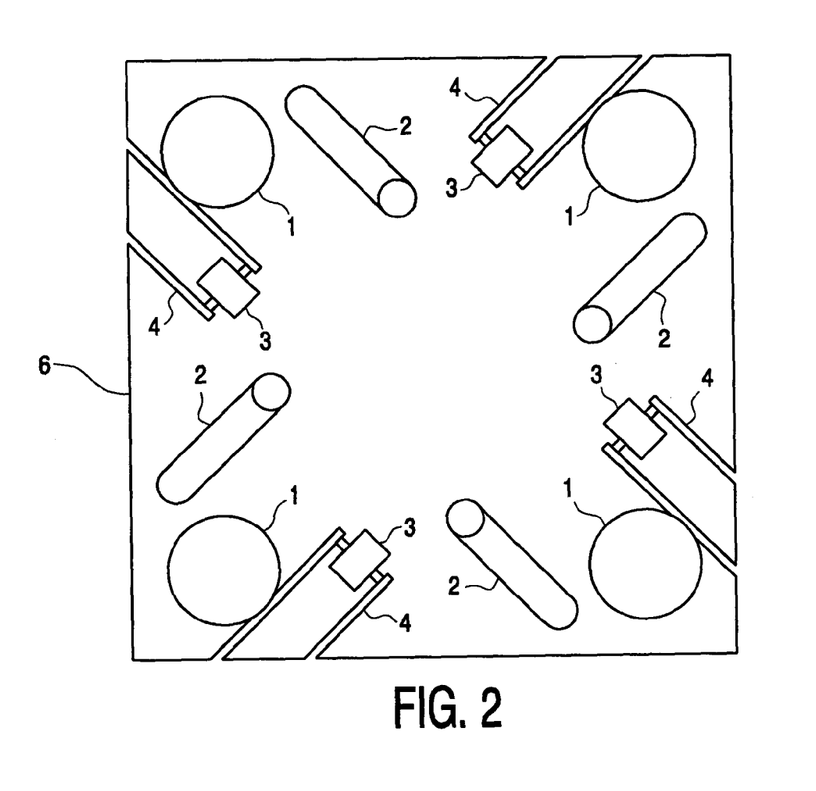
FIG. 2 is a schematic illustration of an example of an optical probe according to one aspect of the invention, wherein the probe comprises four pairs of projection and viewing directions.

FIG. 2 is a schematic illustration of an example of an optical probe according to one aspect of the invention. The probe comprises similar components to that of FIG. 1, except the probe comprises four pairs of projection and viewing directions. The probe comprises a housing, the outline of which is shown 6. Four detectors with optics 1, are positioned at different locations in the probe, such that each has a different viewing direction. The detectors and/or optics may each be placed at a suitable tilt angle so that the light achieves maximum focus across the whole plane of the image. Four lasers 2 each project light onto a mirror assembly 3, 4. The mirror assembly comprises a mirror 3 and a mounting device 4 which oscillates the mirror such that the single point of light emitted by the laser is projected from the probe as a line. Each of the four mirrors reflect the laser light from probe in a different projection direction.

Figure 3:
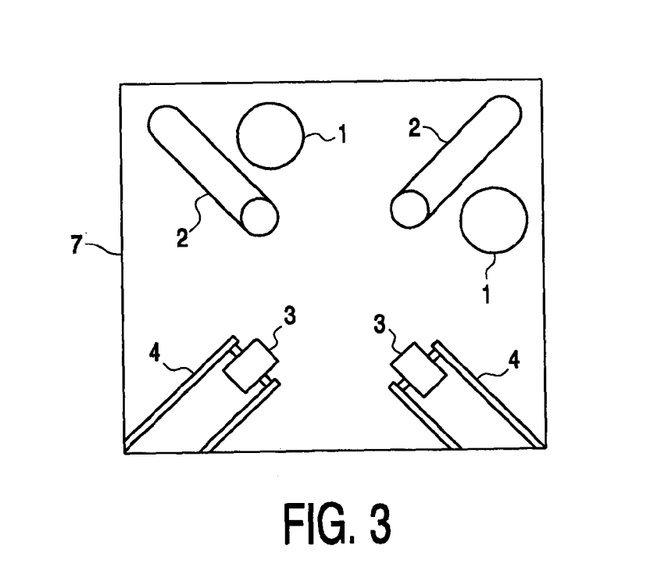
FIG. 3 is a schematic illustration of an example of an optical probe according to one aspect of the invention, wherein the probe comprises two pairs of projection and viewing directions.

FIG. 3 is a schematic illustration of an example of an optical probe according to one aspect of the invention. The probe comprises similar components to that of FIGS. 1 and 2, except the probe comprises two pairs of projection and viewing directions. The probe comprises a housing, the outline of which is shown 7. Two detectors with optics 1, are positioned at different locations in the probe, such that each has a different viewing direction. The detectors and/or optics may each be placed at a suitable tilt angle so that the light achieves maximum focus across the whole plane of the image. Two lasers 2 each project light onto a mirror assembly 3, 4. The mirror assembly comprises a mirror 3 and a mounting device 4 which oscillates the mirror such that the single point of light emitted by the laser is projected from the probe as a line. Each of the two mirrors reflect the laser light from probe in a different projection direction.

Figure 4:
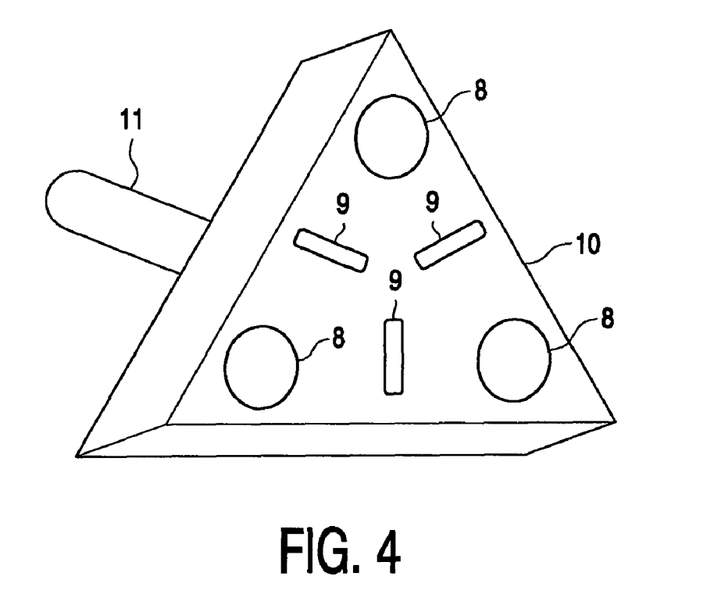
FIG. 4 is a schematic illustration of an example of an optical probe according to one aspect of the invention, wherein the probe comprises three projections and viewing directions.

FIG. 4 is a schematic illustration of an example of an optical probe according to one aspect of the invention. Shown herein is a probe comprising three projections and viewing directions. Illustrated are optics for each of the three viewing directions 8, slits 9 through which light is projected for each projection direction, the outer casing of the probe 10, and a mounting 11 that allows the probe to be connected to a localizer.

Figure 5:
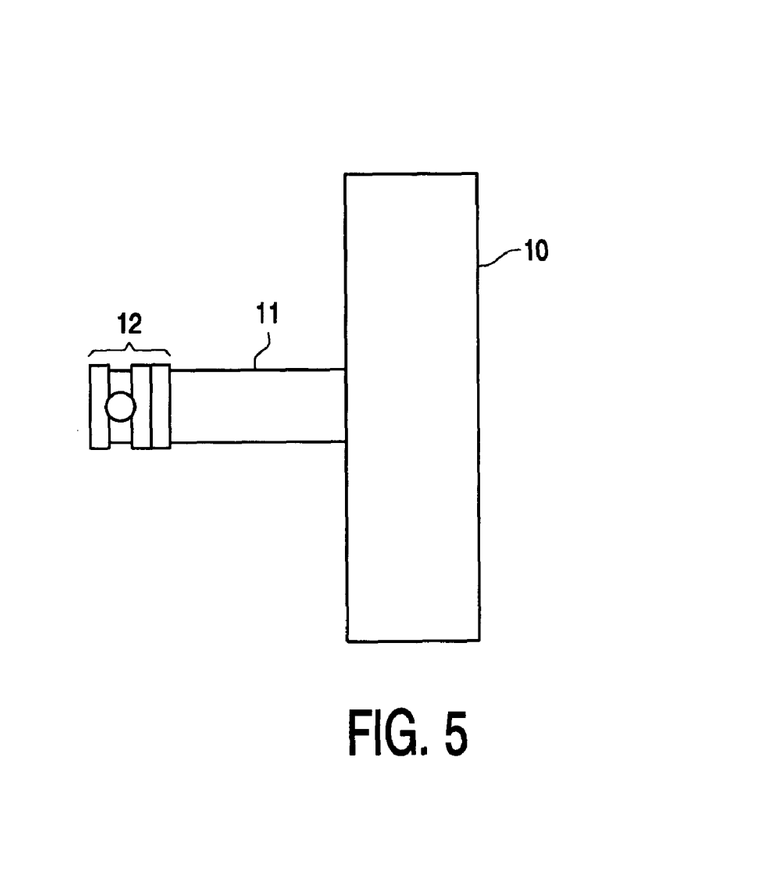
FIG. 5 shows examples of the types of pattern directions projected by a probe.

FIG. 5 is a side-view of the probe according to FIG. 4. Shown is the casing 10, the shaft of the mounting 11 and a coupling 12 that allows the probe to be connected to a localizer.

FIGS. 6–11 show examples of the types of pattern directions projected by a probe.

Figure 6:
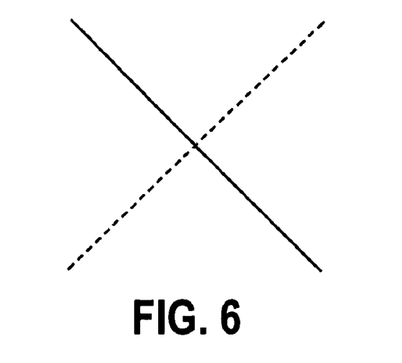
FIG. 6 depicts a cross pattern direction of two lines, each from a different projection direction.

FIG. 6 depicts a cross pattern direction of two lines, each from a different projection direction. One projection direction is a solid line, and the other projection direction is a hatched line.

Figure 7:
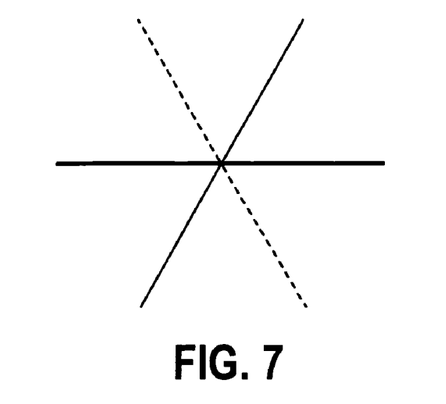
FIG. 7 depicts a cross pattern direction of three lines that all cross at the same point. One projection direction is a solid line, one projection direction is a hatched line, and the other projection direction is a thick line.

FIG. 7 depicts a cross pattern direction of three lines that all cross at the same point. One projection direction is a solid line, one projection direction is a hatched line, and the other projection direction is a thick line.

Figure 8:
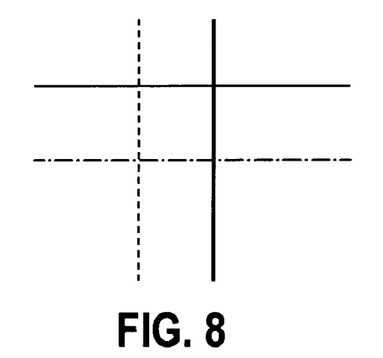
FIG. 8 depicts a square pattern direction of four lines. One projection direction is a solid line, one projection direction is hatched line, one projection direction is a different hatched line, and the other projection direction is a thick line.

FIG. 8 depicts a square pattern direction of four lines. One projection direction is a solid line, one projection direction is hatched line, one projection direction is a different hatched line, and the other projection direction is a thick line.

Figure 9:
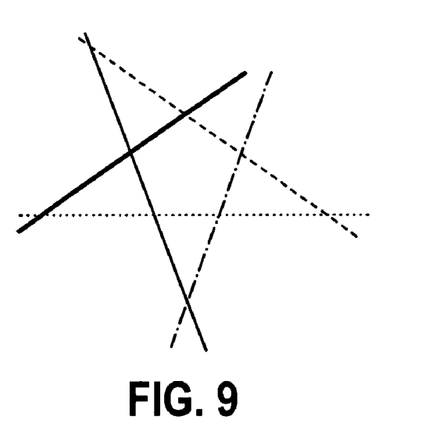
FIG. 9 depicts a pentagon pattern direction of five lines. One projection direction is a solid line, one projection direction is hatched line, one projection direction is a different hatched line, one projection direction is a dotted line and the other projection direction is a thick line.

FIG. 9 depicts a pentagon pattern direction of five lines. One projection direction is a solid line, one projection direction is hatched line, one projection direction is a different hatched line, one projection direction is a dotted line and the other projection direction is a thick line.

Figure 10:
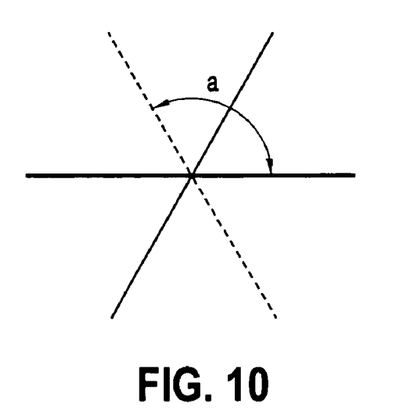
FIG. 10 depicts a cross pattern direction of three lines that all cross at the same point. One projection direction is a solid line, one projection direction is a hatched line, and the other projection direction is a thick line. The angle formed by any two lines (e.g. angle a) may be determined according to the invention. Angle a may be, for example, 120±10 deg.

FIG. 10 depicts a cross pattern direction of three lines that all cross at the same point. One projection direction is a solid line, one projection direction is a hatched line, and the other projection direction is a thick line. The angle formed by any two lines (e.g. angle a) may be determined according to the invention. Angle a may be, for example, 120±10 deg.

Figure 11:
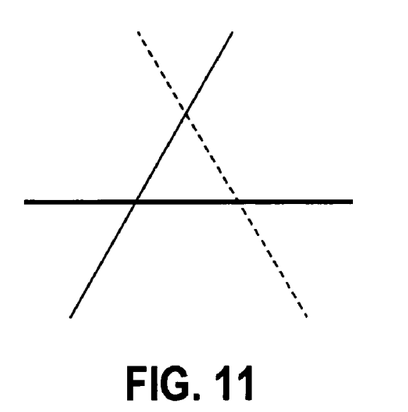
FIG. 11 depicts a triangular pattern direction three lines. One projection direction is a solid line, one projection direction is a hatched line, and the other projection direction is a thick line.

FIG. 11 depicts a triangular pattern direction three lines. One projection direction is a solid line, one projection direction is a hatched line, and the other projection direction is a thick line.

Figure 12:
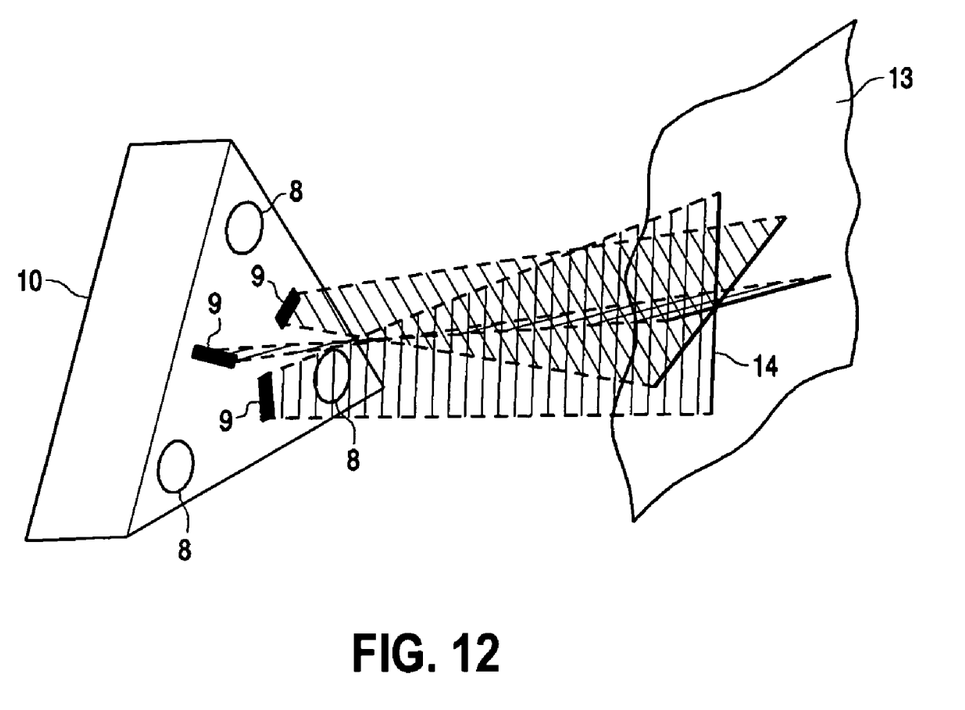
FIG. 12 shows a probe according to the invention projecting a cross shaped pattern direction onto an object to be scanned, wherein the probe comprises three projections and viewing directions.

FIG. 12 shows a probe according to one embodiment of the invention projecting a cross shaped pattern direction onto an object to be scanned. The probe comprising three projections and viewing directions. Illustrated are optics for each of the three viewing directions 8, slits 9 through which light is projected for each projection direction, and the outer casing of the probe 10. The pattern 14 is projected onto an object 13.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of measuring the features of an object using an optical probe comprising more than one projection directions and more than one viewing directions, the method comprising:
   a) configuring the optical probe into two optical groups, wherein each optical group comprises at least one viewing direction and at least one projection direction, and wherein at least one viewing direction and at least one projection direction is different between the optical groups, wherein each optical group consists of one line pattern projected through one projection direction and viewed in at least one viewing direction, wherein the line patterns cross each other orthogonally with a maximum deviation of about 20 degrees, and wherein data generated by the viewing directions is generated only from patterns projected by the projection directions of the same optical group;
   b) collecting data from each optical group while scanning the object; and
   c) obtaining a measurement of the features of the object based on the collected data.

2. The method of claim 1, wherein each optical group has an at least one-dimensional working volume, and each optical group has part of its at least one-dimensional working volume in common with the at least one-dimensional working volume of another optical group.

3. The method of claim 1, wherein each line pattern has two viewing directions, and wherein the viewing directions are positioned opposite to each other with respect to the line pattern.

4. The method of claim 1, wherein light is projected from one optical group at a time.

5. The method of claim 1, wherein light projected from one optical group has a strobing frequency that is different from a strobing frequency of light projected from at least one other optical group.

6. The method of claim 1, wherein the optical probe moves relative to the object while taking measurements.

7. An optical probe configured to measure the features of an object, comprising:
   at least one light source generating two or more patterns through one or more optics, wherein each pattern is projected in a different projection direction, wherein each projection direction projects a pattern that is a line pattern, and wherein the number of projection directions is two and each line pattern crosses the other orthogonally with a maximum deviation of about 20 degrees;
   two or more optics configured to accept the light returning from patterns projected on the object, each optic having a different viewing direction; and
   at least one detector configured to receive light returning through the optics.

8. The optical probe of claim 7, wherein each line pattern has two viewing directions and the viewing directions are positioned opposite to each other with respect to the line pattern.

9. The optical probe of claim 7, wherein the at least one detector is a charge-coupled device (CCD) camera positioned in the probe according to the Schweimpflug principle.

10. The optical probe of claim 7, wherein the at least one detector comprises at least one charge-coupled device (CCD) camera.

11. The optical probe of claim 7, further comprising a mount suitable for connection to a localizer.

12. The optical probe of claim 11, wherein the mount enables position-repeatable coupling and de-coupling of the probe to the localizer.

13. The optical probe of claim 7, further comprising a localizer for positioning and orientating the optical probe in an at least one-dimensional working volume.

14. The optical probe of claim 13, wherein the localizer is capable of one or more rotational and/or one or more translational axes of movement.

15. A method of measuring the features of an object using an optical probe comprising more than one projection directions and more than one viewing directions, the method comprising:
   a) configuring the optical probe into three optical groups, wherein each optical group comprises at least one viewing direction and at least one projection direction, and wherein at least one viewing direction and at least one projection direction is different between the optical groups, wherein each optical group consists of one line pattern projected through one projection direction and viewed in at least one viewing direction, wherein the line patterns of the optical groups cross each other two by two at an angle of 120 degrees±about 20 degrees, and wherein data generated by the viewing directions is generated only from patterns projected by the projection directions of the same optical group;
   b) collecting data from each optical group while scanning the object; and
   c) obtaining a measurement of the features of the object based on the collected data.

16. The method of claim 15, wherein each optical group has an at least one-dimensional working volume, and each optical group has part of its at least one-dimensional working volume in common with the at least one-dimensional working volume of another optical group.

17. The method of claim 15, wherein the optical probe moves relative to the object while taking measurements.

18. The method of claim 15, wherein each line pattern has two viewing directions, and wherein the viewing directions are positioned opposite to each other with respect to the line pattern.

19. The method of claim 15, wherein light is projected from one optical group at a time.

20. The method of claim 15, wherein light projected from one optical group has a strobing frequency that is different from a strobing frequency of light projected from at least one other optical group.

21. A method of measuring the features of an object using an optical probe comprising more than one projection directions and more than one viewing directions, the method comprising:
   a) configuring the optical probe into four optical groups, wherein each optical group comprises at least one viewing direction and at least one projection direction, and wherein at least one viewing direction and at least one projection direction is different between the optical groups, wherein each optical group consists of one line pattern projected through one projection direction and viewed in at least one viewing direction, wherein each line pattern is parallel to one other line pattern with a maximum deviation of about 20 degrees, and orthogonal to the two other line patterns with a maximum deviation of about 20 degrees, and wherein data generated by the viewing directions is generated only from patterns projected by the projection directions of the same optical group;
   b) collecting data from each optical group while scanning the object; and
   c) obtaining a measurement of the features of the object based on the collected data.

22. The method of claim 21, wherein each optical group has an at least one-dimensional working volume, and each optical group has part of its at least one-dimensional working volume in common with the at least one-dimensional working volume of another optical group.

23. The method of claim 21, wherein the optical probe moves relative to the object while taking measurements.

24. The method of claim 21, wherein each line pattern has two viewing directions, and wherein the viewing directions are positioned opposite to each other with respect to the line pattern.

25. The method of claim 21, wherein light is projected from one optical group at a time.

26. The method of claim 21, wherein light projected from one optical group has a strobing frequency that is different from a strobing frequency of light projected from at least one other optical group.

27. An optical probe configured to measure the features of an object, comprising:
   at least one light source generating two or more patterns through one or more optics, wherein each pattern is projected in a different projection direction, wherein each projection direction projects a pattern that is a line pattern, wherein the number of projection directions is three and the line patterns cross each other, and wherein the angle between any two lines is 120 degrees±about 20 degrees;
   two or more optics configured to accept the light returning from patterns projected on the object, each optic having a different viewing direction; and
   at least one detector configured to receive light returning through the optics.

28. The optical probe of claim 27, wherein each line pattern has two viewing directions and the viewing directions are positioned opposite to each other with respect to the line pattern.

29. The optical probe of claim 27, wherein the at least one detector is a charge-coupled device (CCD) camera positioned in the probe according to the Schweimpflug principle.

30. The optical probe of claim 27, wherein the at least one detector comprises at least one charge-coupled device (CCD) camera.

31. The optical probe of claim 27, further comprising a mount suitable for connection to a localizer.

32. The optical probe of claim 31, wherein the mount enables position-repeatable coupling and de-coupling of the probe to the localizer.

33. The optical probe of claim 27, further comprising a localizer for positioning and orientating the optical probe in an at least one-dimensional working volume.

34. The optical probe of claim 33, wherein the localizer is capable of one or more rotational and/or one or more translational axes of movement.

35. An optical probe configured to measure the features of an object, comprising:
   at least one light source generating two or more patterns through one or more optics, wherein each pattern is projected in a different projection direction, wherein each projection direction projects a pattern that is a line pattern, wherein the number of projection directions is four and each line pattern is parallel to one other line pattern with a maximum deviation of about 20 degrees, and orthogonal to the two other line patterns with a maximum deviation of about 20 degrees;
   two or more optics configured to accept the light returning from patterns projected on the object, each optic having a different viewing direction; and
   at least one detector configured to receive light returning through the optics.

36. The optical probe of claim 35, wherein each line pattern has two viewing directions and the viewing directions are positioned opposite to each other with respect to the line pattern.

37. The optical probe of claim 35, wherein the at least one detector is a charge-coupled device (CCD) camera positioned in the probe according to the Schweimpflug principle.

38. The optical probe of claim 35, wherein the at least one detector comprises at least one charge-coupled device (CCD) camera.

39. The optical probe of claim 35, further comprising a mount suitable for connection to a localizer.

40. The optical probe of claim 39, wherein the mount enables position-repeatable coupling and de-coupling of the probe to the localizer.

41. The optical probe of claim 35, further comprising a localizer for positioning and orientating the optical probe in an at least one-dimensional working volume.

42. The optical probe of claim 41, wherein the localizer is capable of one or more rotational and/or one or more translational axes of movement.

* * * * *